US006367585B1

(12) United States Patent  
Fast

(10) Patent No.: US 6,367,585 B1
(45) Date of Patent: Apr. 9, 2002

(54) ADJUSTABLE HUNTING STAND SYSTEM

(75) Inventor: Curtis D. Fast, Mountain Lake, MN (US)

(73) Assignee: Warren D. Carlson, Kerkhoven, MN (US)

( * ) Notice: Subject to any disclaimer, the term of this patent is extended or adjusted under 35 U.S.C. 154(b) by 0 days.

(21) Appl. No.: 09/511,622

(22) Filed: Feb. 23, 2000

(51) Int. Cl.[7] ............................ E04G 3/00; A63B 27/00; A47C 1/02
(52) U.S. Cl. .................. 182/187; 182/135; 297/320; 297/338
(58) Field of Search ................................. 182/134, 135, 182/136, 187, 188, 116, 20; 297/313, 338, 320, 4

(56) References Cited

U.S. PATENT DOCUMENTS

| | | | | |
|---|---|---|---|---|
| 3,729,160 A | * | 4/1973 | D'Imperio | 182/187 X |
| 4,236,602 A | * | 12/1980 | Leggett | 182/187 |
| 4,316,526 A | | 2/1982 | Amacker | |
| 4,331,216 A | | 5/1982 | Amacker | |
| 4,708,221 A | * | 11/1987 | Kubiak | 182/187 |
| 4,742,888 A | | 5/1988 | Amacker | |
| 4,782,918 A | * | 11/1988 | Brunner et al. | 182/187 |
| 4,936,416 A | * | 6/1990 | Garon | 182/187 |
| 4,969,538 A | | 11/1990 | Amacker | |
| 5,090,504 A | | 2/1992 | Amacker | |
| 5,090,505 A | | 2/1992 | Amacker | |
| 5,103,935 A | | 4/1992 | Amacker | |
| 5,143,177 A | * | 9/1992 | Smith | 182/187 |
| 5,249,644 A | | 10/1993 | Amacker | |
| 5,269,395 A | * | 12/1993 | Lyzhoft et al. | 182/187 |
| 5,285,868 A | | 2/1994 | Amacker | |
| 5,297,656 A | * | 3/1994 | Amacker | 182/187 |
| 5,316,104 A | | 5/1994 | Amacker | |

(List continued on next page.)

OTHER PUBLICATIONS

Copy of Amacker/Bowhunter Treestands, Inc. catalog featuring various treestands. Date unknown, 16 pages. P.O. Box 68, Sondhiemer, LA 71276.
Copy of Gametamers catalog featuring various treestands. Date unknown, 8 pages. P.O.Drawer E, 556 Grant Rd. Mineral Wells, TX 76068.
Copy of Bear River Tree Stands catalog featuring various treestands. Date unknown, 8 pages. 3110 Ranchview Lane, Minneapolis, MN 55447.

(List continued on next page.)

Primary Examiner—Daniel P. Stodola
Assistant Examiner—Hugh B. Thompson

(57) ABSTRACT

An adjustable hunting stand system for providing a substantially level platform and seat regardless of the orientation of the structure on which the stand is mounted. The stand system mounts on a tree trunk for supporting a person at an elevated position with respect to a ground surface. The stand system includes a base assembly for mounting to a tree trunk, and a platform assembly. The platform assembly includes a platform member pivotally mounted to the base assembly and a platform support structure for supporting the platform member in a plurality of positions with respect to the base assembly such that the platform is supportable in a level orientation substantially independent of the orientation of the tree trunk. The base assembly includes a support member and a lateral member. A seat structure is positionable along the length of the support member, and a seat is pivotable so that it may be oriented in a level position. A hook member mounts the support member to the tree trunk, and a strap structure further secures the base assembly to the tree trunk. The platform member is pivotally mounted to the lateral member, and the platform support structure includes a platform support slider movable along the support member and a suspension assembly linking the platform member to the platform support slider such that the position of the platform support slider along the support member fixes the pivot extent of the platform member.

18 Claims, 6 Drawing Sheets

U.S. PATENT DOCUMENTS

| | | | |
|---|---|---|---|
| 5,328,240 A | * 7/1994 | Neumuller | |
| 5,332,063 A | 7/1994 | Amacker | |
| 5,341,896 A | 8/1994 | Amacker | |
| 5,379,861 A | 1/1995 | Amacker | |
| 5,409,083 A | * 4/1995 | Thompson et al. | 182/187 |
| 5,450,927 A | * 9/1995 | Harton et al. | 182/187 |
| 5,462,135 A | * 10/1995 | Ambler et al. | 182/187 |
| 5,515,943 A | * 5/1996 | Antonelli | 182/187 |
| 5,562,180 A | * 10/1996 | Herzog et al. | 182/187 |
| 5,927,437 A | * 7/1999 | Fast | 182/187 |
| 6,085,868 A | * 7/2000 | Anthony et al. | 182/187 |
| 6,196,354 B1 | * 3/2001 | Anthony et al. | 182/187 |

OTHER PUBLICATIONS

Copy of Trailhawk Treestands catalog featuring various treestands. Date unknown, 8 pages. 2605 Coulee Ave. La Crosse, WI 54601.

Copy of "Mantis Adjustable Tree Stands" by Comfort Zone Products, Inc. Date unknown, 2 pages. 265 Airport Rd., New Castle, DE 19720.

Copy of Bass Pro Shops fall catalog featuring various treestands. Dated 1999, pp. 24–32, 2500 E. Kearney, Springfield, MO 65898–0123. No month available.

* cited by examiner

ADJUSTABLE HUNTING STAND SYSTEM

BACKGROUND OF THE INVENTION

1. Field of the Invention

The present invention relates to hunting stands and more particularly pertains to a new adjustable hunting stand system for providing a substantially level platform and seat regardless of the orientation of the structure on which the stand is mounted.

2. Description of the Prior Art

The use of hunting stands is known in the prior art. Conventional hunting stands are designed for mounting to upstanding members such as trees, poles, and other generally vertically oriented structures. However, most trees in the wild are not "plumb" and thus typically do not present a perfectly vertical surface on which the hunting stand can be mounted. The known prior art hunting stands typically have a platform that has an operational position that is substantially perpendicular to the mounting surface, and as a result any significant slant of the mounting surface produces a slant in the operational orientation of the platform and seat. This slant of the platform can present a serious hazard to the hunter using the stand, since the stand is usually mounted at least several feet above the ground surface and any fall from the slanted platform will most likely result in an injury. This problem becomes especially serious when one considers that the hunter almost always is carrying a gun or a bow with sharp arrows. Another factor making the hunter's perch on the prior art stands more precarious is the fact that a tree almost invariably presents a curved surface against which the stand must be mounted, and the shifting of the hunter's weight on the platform can cause the stand to pivot on the tree surface.

The adjustable hunting stand system according to the present invention substantially departs from the conventional concepts and designs of the prior art, and in so doing provides an apparatus primarily developed for the purpose of providing a substantially level platform regardless of the orientation of the structure on which the stand is mounted.

SUMMARY OF THE INVENTION

In view of the foregoing disadvantages inherent in the known types of hunting stands now present in the prior art, the present invention provides a new adjustable hunting stand system construction wherein the same can be utilized for providing a substantially level platform regardless of the orientation of the structure on which the stand is mounted. In particular, the stand has provisions to enable the platform and seat to be leveled on a tree that is either slanted sideways or fore and aft, or slanted both sideways and fore and aft. In addition, the platform and seat may be adjusted either separately or together.

To attain this, the present invention generally comprises a stand system for mounting on an upstanding member such as a tree trunk and for supporting a person at an elevated position with respect to a ground surface. The adjustable hunting stand system includes a base assembly for mounting to an upstanding member and a platform assembly. The platform assembly comprises a platform member pivotally mounted to the base assembly and a platform support structure supporting the platform member in a plurality of positions with respect to the base assembly such that the platform is supportable in a level orientation substantially independent of the orientation of the upstanding member.

The base assembly may comprise a base structure including a support member for positioning adjacent to the upstanding member and a lateral member mounted to a lower end of the support m member. The support member may have a plurality of positioning apertures, and a seat structure is mounted to the support member and is positionable along a length of the support member. The seat structure may include a carriage assembly being slidably mounted to the support member and being selectively fixable in a plurality of positions and an arm assembly including an arm member pivotally mounted to the carriage assembly. The arm member is selectively positionable at a plurality of pivot positions with respect to the carriage assembly. The arm assembly may include an adjustment member mounted to the arm member for providing fine adjustment of the angle of the position of the arm member with respect to the carriage assembly.

Attachment means comprising a hook member, a strap or the like may be provided for mounting on an upstanding member and suspending the base assembly from the upstanding member.

The platform support structure may include a platform support slider movable along the support member, and a suspension assembly comprising at least one suspending member linking the platform member to the platform support slider such that the position of the platform support slider along the support member fixes the pivot extent of the platform member.

Optionally, the seat structure may be pivoted with the platform member. The base assembly may comprise a sling seat structure including a first sling support member mounted to the support member near the upper end of the support member, a position adjusting slider assembly being slidably mounted to the support member, and a second sling support member mounted to the position adjusting slider assembly. A sling seat extends between the first and second sling support members, and may comprise a panel of material looped about the first and second sling support members. An optional suspension assembly includes at least one suspending member linking the platform member to the position adjusting slider such that position of the position adjusting slider fixes the pivot extent of the platform member and the orientation of the sling seat structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

A highly significant object of the present invention is to provide a new adjustable hunting stand system for providing a substantially level platform regardless of the orientation of the structure on which the stand is mounted. The new adjustable hunting stand system may be mounted on trees that deviate from a plumb orientation, or that have surface irregularities, that would make prior art stands unstable or place the prior art platforms at such a slope that the platform is dangerous to stand on, and thereby making available a much greater variety of stand mounting locations unusable with prior art stands. A seat may be positioned in an orientation that is substantially parallel to the platform for greater comfort for the hunter using the adjustable hunting stand system.

One object of the present invention to provide a new adjustable hunting stand system apparatus and method which has many of the advantages of the hunting stands mentioned heretofore and many novel features that result in a new adjustable hunting stand system which is not anticipated, rendered obvious, suggested, or even implied by any of the prior art hunting stands, either alone or in any combination thereof.

It is another object of the present invention to provide a new adjustable hunting stand system which may be easily and efficiently manufactured and marketed.

It is a further object of the present invention to provide a new adjustable hunting stand system which is of a durable and reliable construction.

An even further object of the present invention is to provide a new adjustable hunting stand system which is susceptible of a low cost of manufacture with regard to both materials and labor, and which accordingly is then susceptible of low prices of sale to the consuming public, thereby making such adjustable hunting stand system economically available to the buying public.

Still yet another object of the present invention is to provide a new adjustable hunting stand system which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
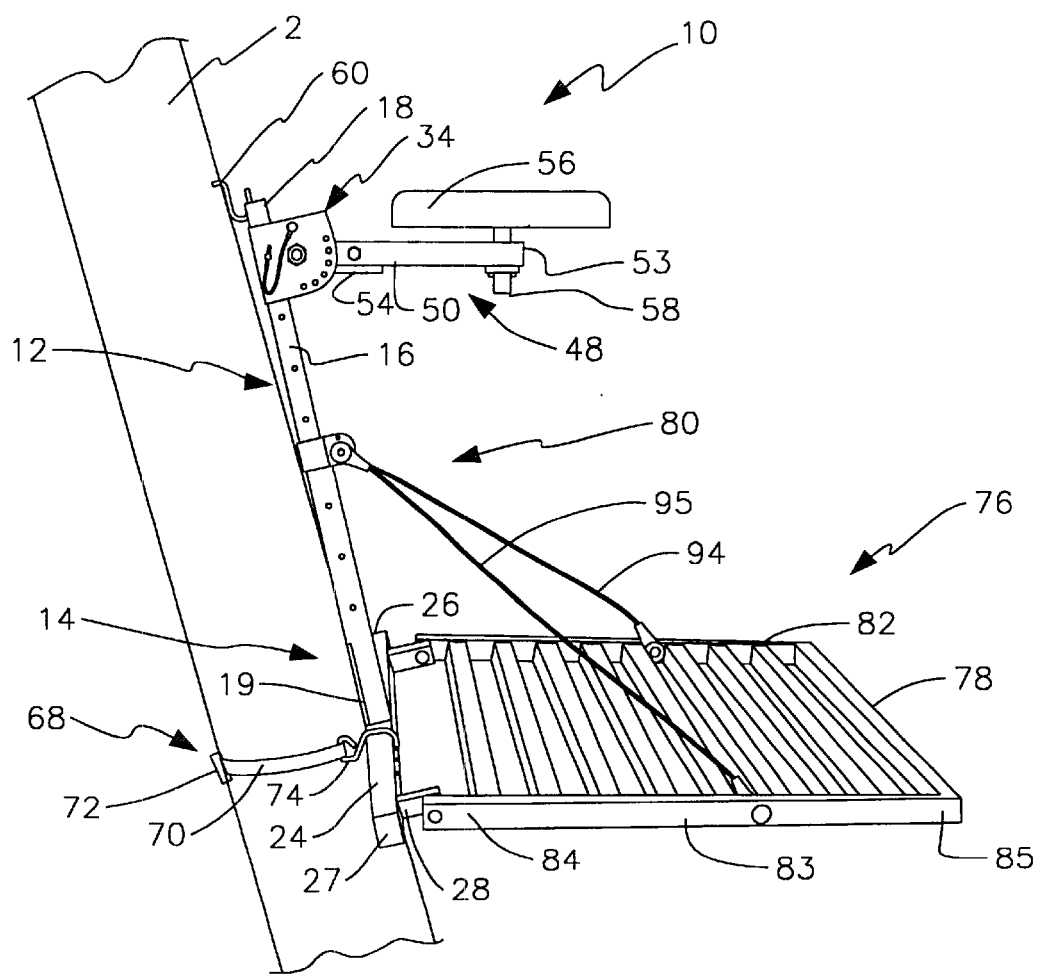
FIG. 1 is a schematic side perspective view of a new adjustable hunting stand system according to the present invention.
Figure 2:
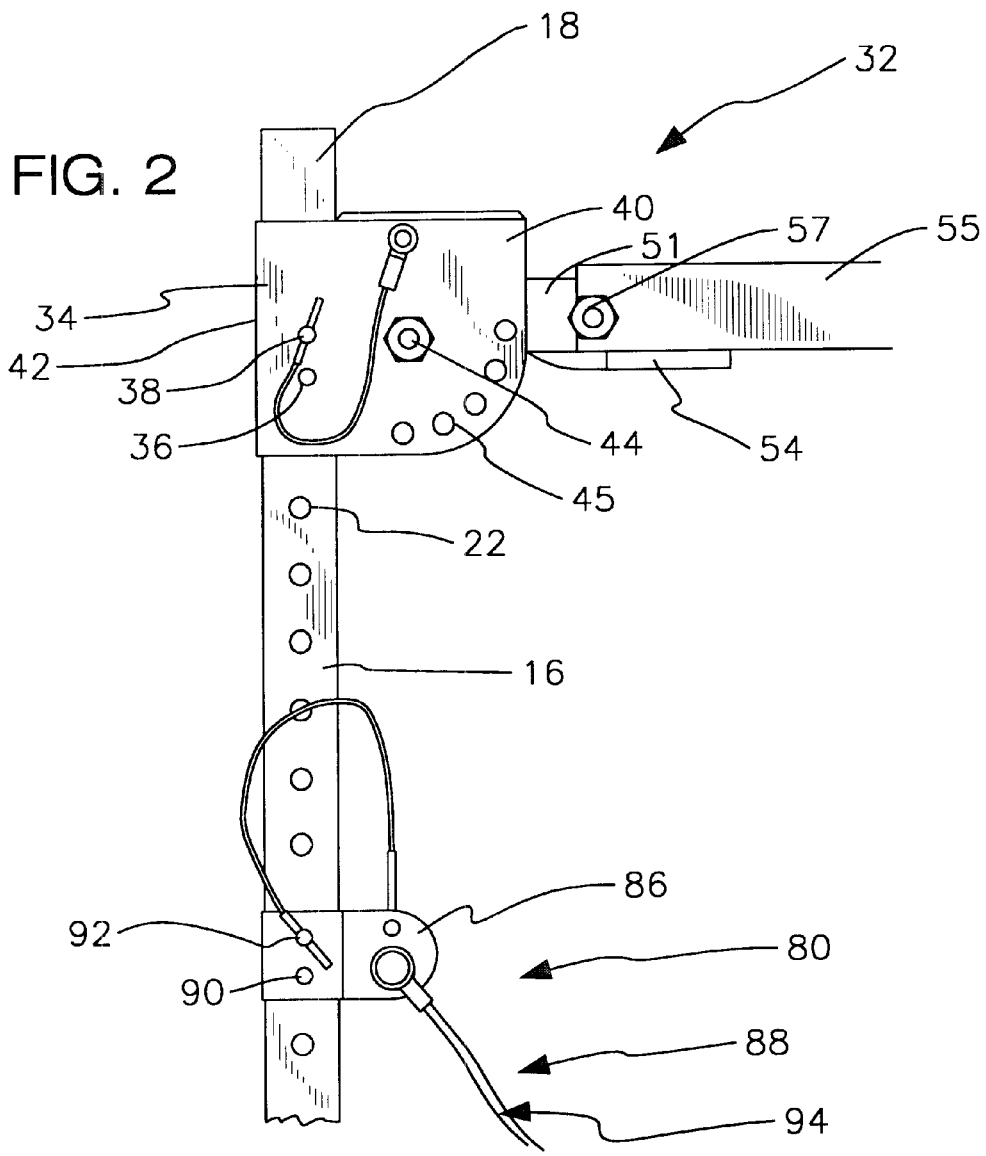
FIG. 2 is a schematic side view of a portion of the support member of the present invention particularly illustrating the relationship of the seat structure and the platform support structure to the support member.
Figure 3:
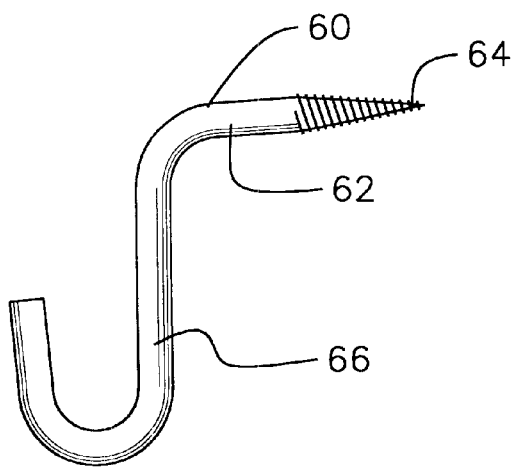
FIG. 3 is a schematic side view of a hook member of the present invention.
Figure 4:
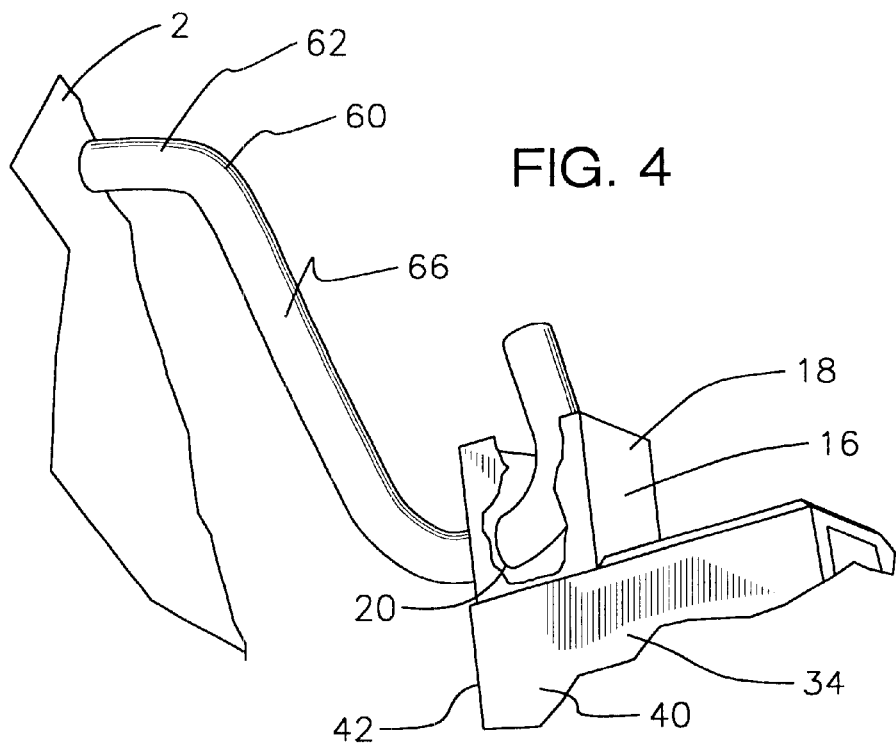
FIG. 4 is a schematic perspective view of the hook member and a broken away portion of the support member mounted to a tree.
Figure 5:
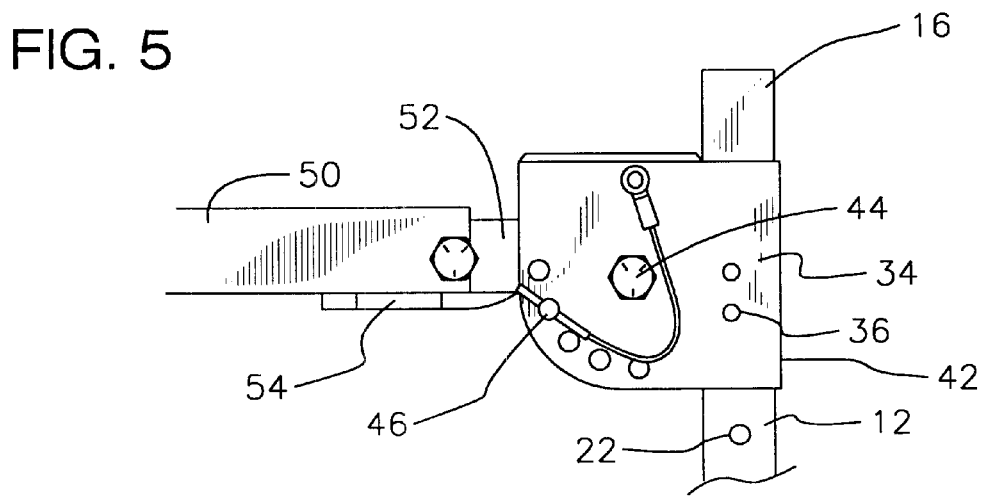
FIG. 5 is a schematic side view of the carriage assembly and a portion of the arm assembly of the present invention.
Figure 6:
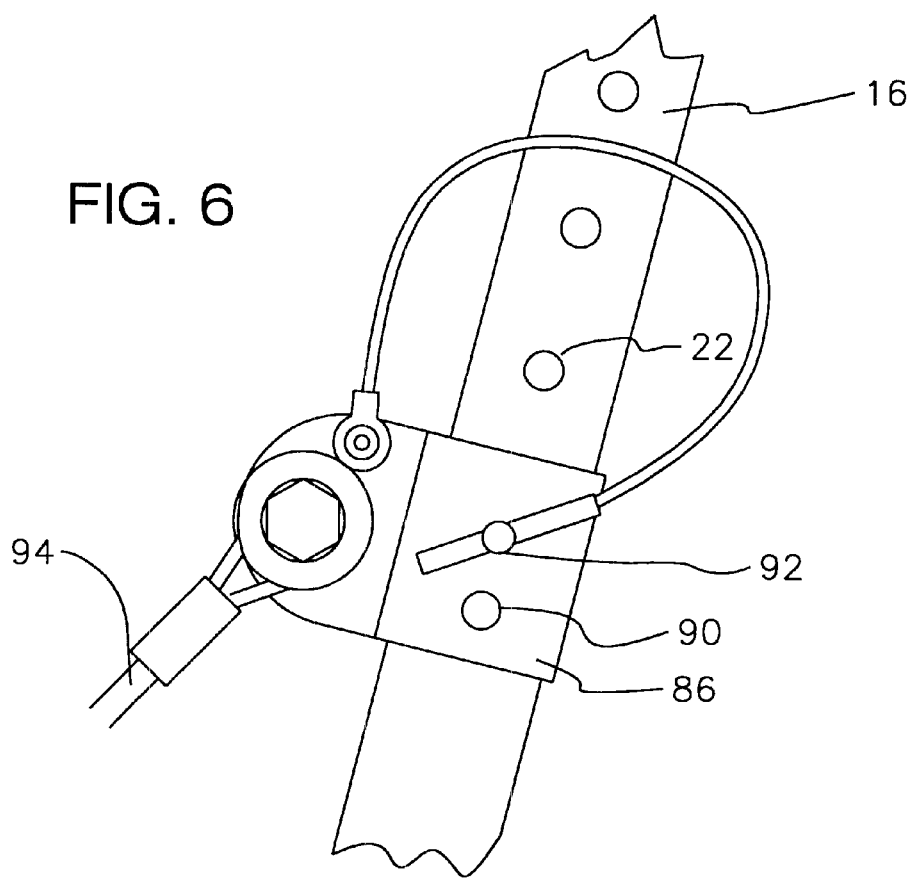
FIG. 6 is a schematic side view of a portion of the support member with the platform support slider mounted thereon.
Figure 7:
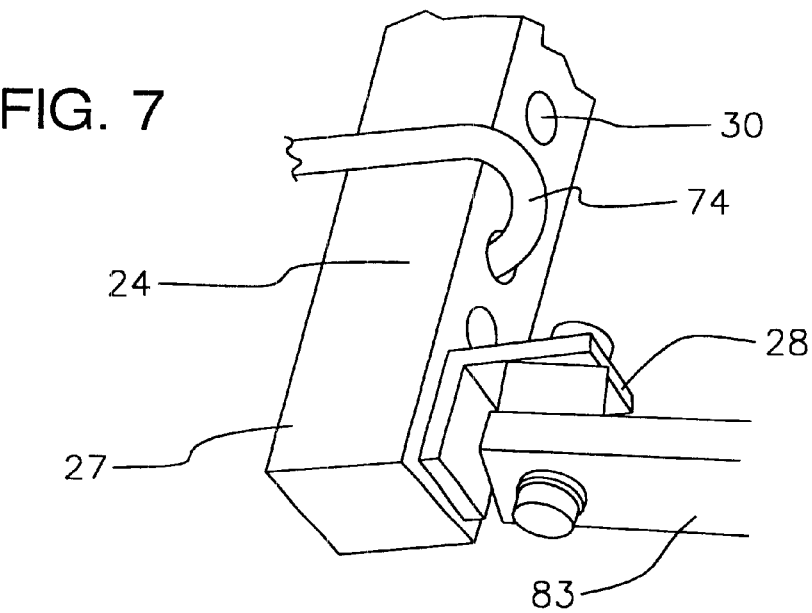
FIG. 7 is a schematic perspective view of an end of the lateral member of the base structure of the present invention.

With reference now to the drawings, and in particular to FIGS. 1 through 10 thereof, a new adjustable hunting stand system embodying the principles and concepts of the present invention and generally designated by the reference numeral 10 will be described.

As best illustrated in FIGS. 1 through 10, the adjustable hunting stand system 10 is highly effective for mounting on an upstanding member 2 such as a tree trunk or a post for supporting a person on the upstanding member at an elevated position with respect to a ground surface. The stand generally comprises a base assembly 12 and a platform assembly 76 (see FIG. 1).

The base assembly 12 of the invention is provided for mounting the invention to an upstanding member. The base assembly comprises a base structure 14, a seat structure 32, a hook member 60, and a strap structure 68.

The base structure 14 includes a support member 16 for positioning adjacent to the upstanding member in a substantially parallel orientation to the upstanding member. The support member may be elongate with an upper end 18 and a lower end 19. The upper end of the support member has a support aperture 20 for accepting a hook member described below. It should be realized that the invention may be adapted to employ two (or even more) support members, although the use of more than one support member has a plurality of positioning apertures 22 arranged between the upper and lower ends. The apertures 22 may extend through the support member, and are located for optimum adjustability. Optionally the aperture 22 may be substantially uniformly spaced along a length of the member, and may be positioned along an upper half of the length of the support member.

The base structure also may include a lateral member 24 mounted to the lower end of the support member. The lateral member may extend laterally outward from the support member. The lateral member may be elongate with opposite ends 26, 27 The lateral member be mounted to the lower end of the support member at a substantially central location ont eh lateral member. A mounting ear 28 may be mounted to the lateral member adjacent to each of the oppossite ends. The lateral member may be a plurality of anchoring apertures 30 arranged between the opposite ends of the lateral member. The anchoring apertures may extend through the lateral member, and are preferably substantially uniformly spaced along a length of the lateral member.

The seat structure 32 may be mounted to the base structure. The seat structure may be positioned along the length of the support member. The seat structure may include a carriage assembly 34 slidably mounted to the support member. The position of the carriage assembly on the support member is selectively fixable. The carriage assembly has a fixing aperture 36 adapted to be aligned with one of the positioning apertures of the base structure. The carriage assembly may be provided with more than one fixing aperture, with a spacing between the fixing apertures being less than the spacing between the positioning apertures, to permit a finer or more precise positioning of the carriage assembly using either of the fixing apertures and the plurality of positioning apertures. A fixing pin 38 is provided for insertion in the fixing aperture and one of the positioning apertures for locking the carriage assembly against movement relative to the support member. As an option, the fixing pin may be secured to the carriage assembly by a lanyard member that reduces the possibility of loss of the fixing pin.

The carriage assembly 34 includes a pair of spaced plates 40 each positioned on a lateral side of the support member. A connecting plate 42 extends between the spaced plates and connects the spaced plates together. A pivot rod 44 extends between the spaced plates, and a plurality of pivot position holes 45 are located at a plurality of positions about the pivot rod. A pivot position pin 46 is provided for removable insertion into the plurality of pivot position holes.

The seat structure may include an arm assembly 48 mounted to the carriage assembly. The arm assembly includes an arm member 50 having opposite ends with a first one 52 of the opposite ends being pivotally mounted to the carriage assembly 34 and a second one 53 of the opposite ends being free and extending over the platform member 78. The first end of the arm member may be mounted to the pivot rod 44 of the carriage assembly and may be positioned between the spaced plates 40. The arm member is thus permitted to pivot relative to the carriage assembly, and the support member of the base structure. The pivot of the arm member is restricted by the pivot position pin when the pivot position pin is inserted through one of the pivot position holes, and the arm member rests against the pivot position pin. The orientation of the arm member is thus adjustable with respect to the support member in that a lower limit of the downward pivot movement of the arm member may be established by the position of the pivot position pin.

The arm assembly may include an adjustment member 54 mounted on the arm member. The adjustment member is slidably movable in a longitudinal direction of the arm member. The adjustment member may be slid toward the carriage assembly and interposed between the pivot position pin of the carriage assembly and the place where the pin would contact the arm member when the pivot position pin is inserted in one of the pivot position holes. The adjustment member has an end with a tapering thickness such that slidable movement of the adjustment member varies the thickness of the adjustment member that may be interposed between the arm member and the pivot position pin of the carriage assembly. By adjusting the position of the adjustment member, the adjustment member thus permits fine adjustment of the angle of the position of the arm member with respect to the carriage assembly and the base structure. This is especially useful when one pivot position hole setting of the pivot position pin places the arm member too high, and a lower adjacent pivot position hole setting of the pivot position pin places the arm member too low.

The seat structure may include a seat 56 mounted on the arm member. The seat has a seat post 58 removably mounted on the arm member adjacent to the free end of the arm member. The seat may be pivotally mounted on the arm member to permit rotational movement of the seat with respect to the arm member. A removable pin may be provided to extend through the seat post to secure the seat post in the seat hole of the arm member.

One embodiment of the arm member of the invention includes an arm member 50 that comprises two segments, a first segment 51 and a second segment 55. The first and second segments are pivotally connected together by an arm segment pivot pin 57 that permits the second (outboard) segment to be pivoted upwardly with respect to the first segment and the base structure for conveniently allowing the second segment of the arm member (and the seat mounted thereon) to be rotated upward toward the support member into a storage position that permits freer movement about the platform member 78, such as when the hunter prefers to stand on the platform rather than utilize the seat.

The hook member 60 of the base assembly is provided for mounting on an upstanding member 2 and suspending the base structure 14 from the upstanding member. The hook member includes a mounting portion 62 for penetrating a surface of the upstanding member. The mounting portion has a diameter that tapers to a tip 64. A portion of the mounting portion located adjacent to the tip has an exterior surface with threads thereon adapted for penetrating the upstanding member. The hook member also has a hook portion 66 for engaging a support aperture 20 of the base structure for suspending the base structure therefrom. The hook portion is mounted to the mounting portion at a location opposite the tip of the mounting portion. The hook portion preferably has a substantially J-shaped configuration.

The strap structure 68 of the base assembly is provided for securing the base structure to the upstanding member 2. The strap structure includes one or more straps 70, with each strap having opposite ends. A buckle 72 may be employed for adjustably joining ends of the straps together. The buckle permits adjustment of a length of the straps between free ends of the straps not joined by the buckle. The strap structure also includes a pair of hooks 74, with each of the hooks being mounted to an free end of the straps opposite the buckle. Each of the hooks is removably secured to one of the plurality of the anchoring apertures 30 in the lateral member. In use, the buckle and straps are looped about the upstanding member with each of the hooks secured to one of the anchoring apertures located adjacent to the upstanding member, and the straps and buckle are cinched tight to secure the base structure to the upstanding member.

Optionally, the hook member 60 may be replaced by a strap structure similar to the above described strap structure if it is desired not to mount the hook member on the tree. The strap structure may have a buckle slider that is connectable to one or more straps that encircle the upstanding member, and the buckle slider may have a hook mounted thereon that is directed outwardly from the surface of the upstanding member for engaging the support aperture of the support member. The buckle slider may include a ratchet mechanism for selectively tightening and loosening the strap about the upstanding member.

The platform assembly 76 of the invention is mounted to the base assembly. The platform assembly includes a platform member 78 and a platform support structure 80. The platform member is provided for supporting a person standing on the platform member. The platform member is pivotally mounted to the lateral member 24 of the base assembly for permitting pivoting of the platform member between a stored position adjacent to the support member of the base assembly and an operational position. The operational position is characterized by the platform member being oriented generally level, virtually regardless of any slant of the upstanding member 2 out of a plumb orientation, and virtually regardless of the orientation of the support member.

One embodiment of the platform member may include a pair of spaced sides 82, 83 extending between a proximate end 84 and a distal end 85 of the platform member. The proximate end is pivotally mounted to the lateral member of the base structure. The platform member includes side bars extending along the spaced sides. The side bars are pivotally connected to the mounting ears of the lateral member. The platform member may also include distal and proximal bars extending between the side bars, and a plurality of bars positioned between the distal and proximal bars, and extending between the side bars. Optionally, the platform member may be covered with wire screen or other material.

The platform support structure 80 is provided for supporting the platform member in a selected position relative to the base structure. The platform support structure may be slidably mounted to the support member of the base structure. The platform support structure may include a platform support slider 86 and a suspension assembly 88.

The platform support slider is slidably mounted on the support member of the base structure. The platform support slider has a channel for receiving the support member therethrough. The support slider has a slider aperture 90 for aligning with one of the plurality of positioning apertures 20. A positioning pin 92 is provided for removably inserting through the slider aperture and one of the positioning apertures for selectively fixing the position of the support slider with respect to the support member.

The suspension assembly 88 may include a pair of suspending members 94, 95 linking the platform member to the platform support slider. The suspending members are preferably flexible but substantially inelastic in tension. Each of the suspending members has opposite ends, with one of the opposite ends being mounted to the platform support slider and the other of the opposite ends being mounted to a side of the platform member such that position of the platform support slider fixes the pivot extent of the platform member.

A significant feature of the aforedescribed invention is that the platform may be positioned in a plurality of pivotal orientations with respect to the base assembly, and therefore the orientation of the upstanding member at a slant with respect to plumb does not restrict or prevent the platform member from being oriented in a level condition.

Figure 8:
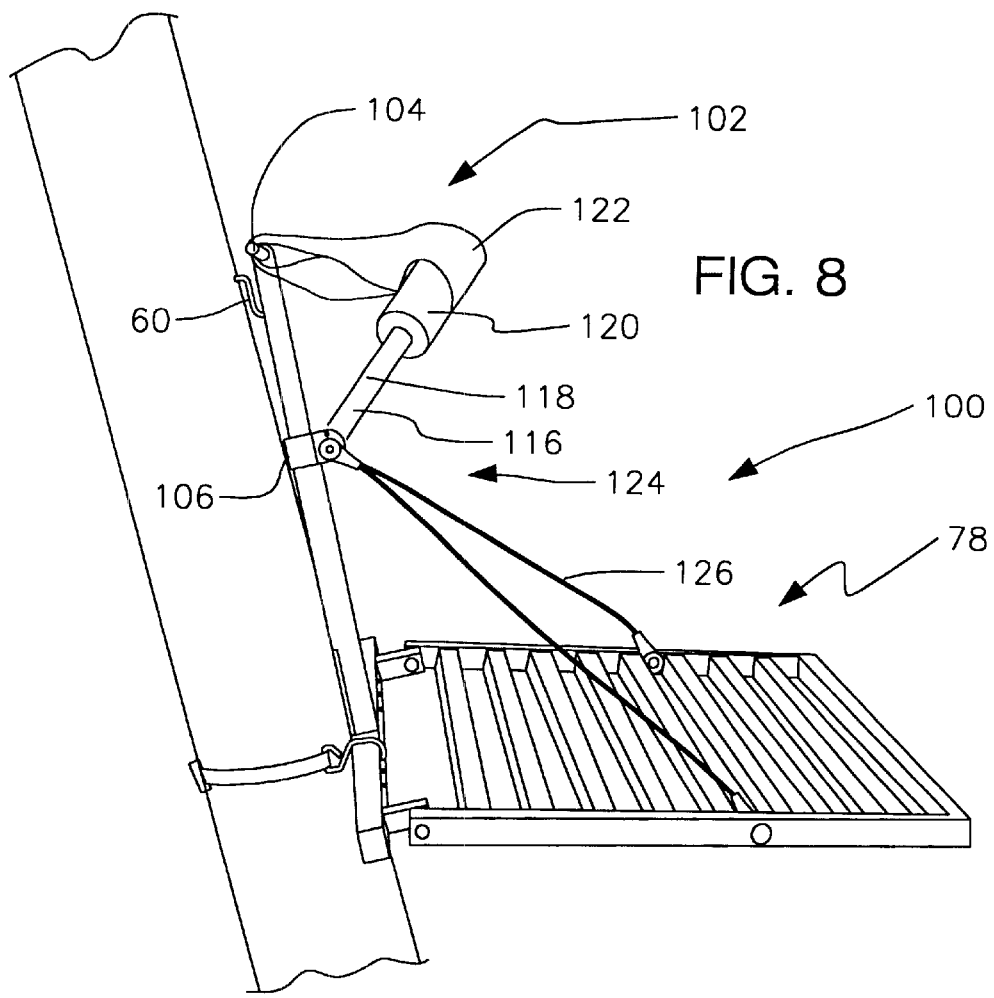
FIG. 8 is a schematic perspective side view of a hunting stand illustrating optional features of the present invention.
Figure 9:
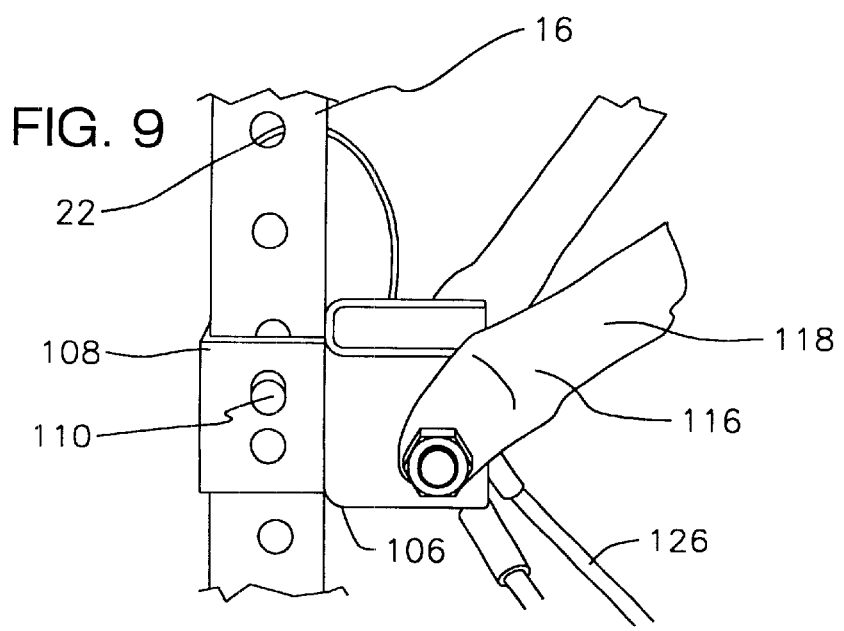
FIG. 9 is a schematic side perspective view of the position adjusting slider of the present invention mounted on a portion of the support member.
Figure 10:
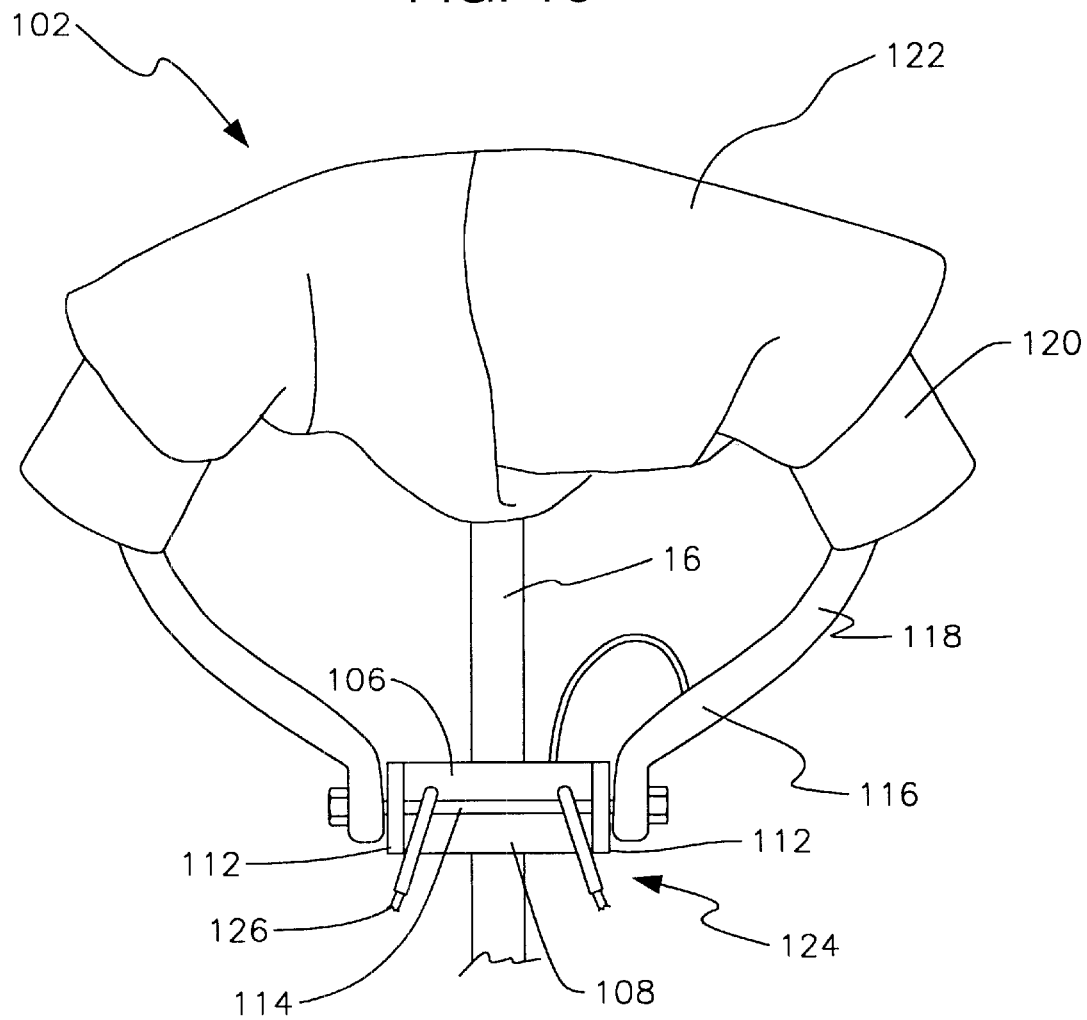
FIG. 10 is a schematic front view of the optional sling seat structure of the present invention.

An optional embodiment 100 of the invention, in which a number of optional features may be employed, is shown in FIGS. 8 through 10. This optional embodiment employs a number of features in common with the previously disclosed embodiment, as will be evident from the Figures, and these optional features may suitably be combined with the aforedescribed features for further optional embodiments. As such, the following description focuses on the variation from the features of the above described embodiment.

One of the optional features is a sling seat structure 102 mounted to the base structure. The sling seat structure includes a first sling support member 104 mounted to the support member 16 near the upper end 18 of the support member. The first sling support member extends laterally from the upper end of the support member.

The sling seat structure includes a position adjusting slider assembly 106 which is slidably mounted to the support member. The position of the position slider assembly on the support member is selectively fixable. The position adjusting slider assembly includes a sleeve 108 having a passage slidably receiving the support member. The sleeve has a slider aperture for aligning with one of the plurality of positioning apertures in the support member. A positioning pin 110 is removably inserted through the slider aperture and into one of the positioning apertures. A pair of spaced tabs 112 are mounted to the sleeve, and a mounting rod 114 extends between the spaced tabs.

A second sling support member 116 is mounted to the position adjusting slider assembly. The second sling support member is pivotally mounted to the sleeve. The second sling support member includes a hoop member 118 having a substantially linear middle portion, and a padding sheath 120 mounted on the middle portion of the hoop member. The padding sheath preferably comprises a tubular resiliently compressible foamed material.

A sling seat 122 extends between the first and second sling support members. The sling seat comprises a panel of material looped about the first and second sling support members.

The platform of this optional embodiment includes a platform support structure 124, which preferably comprises a pair of suspending members 126 linking the platform member to the position adjusting slider of the base structure. Each of the suspending members has opposite ends, with one of the opposite ends being mounted to the mounting rod of the position adjusting slider assembly 106 and the other of the opposite ends being mounted to a side of the platform member such that position of the position adjusting slider fixes the pivot extent of the platform member 78.

Significantly, the structure of the optional embodiment permits simultaneous adjustment of the orientations of the sling seat 122 and the platform member such that both may be brought into a level orientation with the positioning of the position adjusting slider. It will be realized that the sling seat and the platform member may be maintained in a substantially parallel orientation throughout the range of pivot movement by fixing the lengths of the second sling support member and the suspending members at a length that provides these elements with a substantially parallel orientation.

In use, the tip 64 of the hook member 66 is screwed into an upstanding member such as a tree trunk. The support member 16 is suspended from the hook member by inserting the hook portion 66 into the support aperture 20 of the support member. The strap structure 68 is looped about the tree trunk and the ends of the straps are hooked to the anchoring apertures 30 of the lateral member 24 at locations most closely adjacent to the tree trunk, even if the tree trunk is offset or spaced from the center of the lateral member. The carriage assembly 34 is positioned on the support member at a location that positions the seat at a level that permits comfortable resting of the feet of the user on the platform when the user is seated on the seat. The carriage assembly is locked against sliding movement by inserting the fixing pin 38 into the fixing aperture 36 and one of the positioning apertures. The arm member 50 of the seat structure is pivoted into a position that orients the seat 56 in a substantially level position for comfortable seating of the user. The pivot position pin 46 is inserted into the pivot position hole 45 just below the arm member to support the arm member in the proper position. If the seat is not suitably level, the adjustment member 54 may be slid along the arm member to vary the thickness of the adjustment member between the arm member and the pivot position pin for effecting a fine adjustment of the pivot position of the arm member.

The platform member 78 is then brought into a substantially level position by sliding the platform support slider 86 along the support member until the suspending members 94, 95 bring the platform member into suitably level orientation, and the positioning pin 92 is inserted in the slider aperture 90 and into one of the positioning apertures 22, to secure the slider 86 against downward pivoting with respect to the support member.

When the optional sling seat structure 102 and position adjusting slider assembly 106 is employed, the leveling of the sling seat and the platform member is accomplished simultaneously in a single step, by adjusting the position of the position adjusting slider assembly on the support member, and inserting the positioning pin 110 through the slider aperture 90 and into one of the positioning apertures.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. In view of the foregoing, it will be appreciated that one may utilize the foregoing teaching and make virtually an endless variety of modifications in the materials, locking and fastening structures, seat styles, cosmetic features, details of construction, design of the carriage and other components, and structures for fastening the hunting stand to a tree. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable hunting stand system for mounting on an upstanding member for supporting a person at an elevated position with respect to a ground surface, the adjustable hunting stand system comprising:
   a base assembly for mounting to an upstanding member; and
   a platform assembly comprising:
      a platform member for supporting a person, the platform member being pivotally mounted to the base assembly; and
      a platform support structure supporting the platform member in a plurality of positions with respect to the base assembly such that the platform is supportable in a level orientation substantially independent of the orientation of the upstanding member;
   wherein the base assembly comprises a base structure including a support member for positioning adjacent to the upstanding member and having an upper end and a lower end, and a lateral member mounted to the lower end of the support member, the lateral member extending laterally outward from the support member;
   wherein the upper end of the support member has a support aperture therein, and additionally comprises a hook member for mounting on an upstanding member and suspending the base assembly from the upstanding member, the hook member comprising:
      a mounting portion for penetrating a surface of the upstanding member, the mounting portion having a diameter tapering to a tip, a portion adjacent to the tip having an exterior surface with threads thereon adapted for penetrating the upstanding member; and
      a hook portion for engaging the support aperture of the support member, the hook portion having a J-shape for removably inserting into the support aperture in the support member such that the support member depends from the hook portion.

2. The stand system of claim 1 wherein the support member further comprises a plurality of positioning apertures; and
   a seat structure mounted to the support member and being positionable along a length of the support member, the seat structure comprising:
      a carriage assembly being slidably mounted to the support member and being selectively fixable in a plurality of positions; and
      an arm assembly including an arm member pivotally mounted to the carriage assembly, the arm member being selectively positionable at a plurality of pivot positions with respect to the carriage assembly.

3. The stand system of claim 2 wherein the seat structure further includes a seat mounted on the arm member, the seat having a seat post being removably mounted in a seat hole in the arm member adjacent to the free end of the arm member, the seat being pivotally mounted to permit rotational movement of the seat with respect to the arm member.

4. An adjustable hunting stand system for mounting on an upstanding member for supporting a person at an elevated position with respect to a ground surface, the adjustable hunting stand system comprising:
   a base assembly for mounting to an upstanding member; and
   a platform assembly comprising:
      a platform member for supporting a person, the platform member being pivotally mounted to the base assembly; and
      a platform support structure supporting the platform member in a plurality of positions with respect to the base assembly such that the platform is supportable in a level orientation substantially independent of the orientation of the upstanding member;
   wherein the base assembly comprises a support member having a plurality of positioning apertures; and
   a seat structure mounted to the support member and being positionable along a length of the support member, the seat structure comprising:
      a carriage assembly being slidably mounted to the support member and being selectively fixable in a plurality of positions; and
   an arm assembly including an arm member pivotally mounted to the carriage assembly, the arm member being selectively positionable at a plurality of pivot positions with respect to the carriage assembly;
   wherein the arm assembly includes an adjustment member mounted to the arm member, the adjustment member being slidably movable in a longitudinal direction of the arm member, the adjustment member being interposable between the arm member and the carriage assembly, the adjustment member having an end with a tapering thickness such that slidable movement of the adjustment member varies the thickness of the adjustment member interposed between the arm member and the carriage assembly for permitting fine adjustment of the angle of the position of the arm member with respect to the carriage assembly.

5. The stand system of claim 4 wherein the lateral member has a plurality of anchoring apertures.

6. The stand system of claim 4 wherein the base assembly comprises a base structure including the support member for positioning adjacent to the upstanding member and having an upper end and a lower end, and a lateral member mounted to the lower end of the support member, the lateral member extending laterally outward from the support member.

7. The stand system of claim 4 wherein the upper end of the support member has a support aperture therein, and additionally comprising a hook member for mounting on an upstanding member and suspending the base assembly from the upstanding member, the hook member comprising:
a mounting portion for penetrating a surface of the upstanding member, the mounting portion having a diameter tapering to a tip, a portion adjacent to the tip having an exterior surface with threads thereon adapted for penetrating the upstanding member,
a hook portion for engaging the support aperture of the support member.

8. An adjustable hunting stand system for mounting on an upstanding member for supporting a person at an elevated position with respect to a ground surface, the adjustable hunting stand system comprising:
a base assembly for mounting to an upstanding member; and
a platform assembly comprising:
a platform member for supporting a person, the platform member being pivotally mounted to the base assembly; and
a platform support structure supporting the platform member in a plurality of positions with respect to the base assembly such that the platform is supportable in a level orientation substantially independent of the orientation of the upstanding member;
wherein the lateral member has a plurality of anchoring apertures;
wherein the base assembly comprises a strap structure for securing the base assembly to the upstanding member, the strap structure comprising:
a pair of straps each having opposite ends;
a buckle for adjustably joining an end of each of the straps together, the buckle permitting adjustment of a length of the straps between free ends of the straps not joined by the buckle, and
a pair of hooks, each of the hooks being mounted to an free end of the straps opposite the buckle, each of the hooks being removably secured to one of the plurality of the anchoring apertures in the lateral member.

9. The stand system of claim 8 wherein the base assembly comprises a base structure including a support member for positioning adjacent to the upstanding member and having an upper end and a lower end, and a lateral member mounted to the lower end of the support member, the lateral member extending laterally outward from the support member.

10. The stand system of claim 9 wherein the platform support structure is slidably mounted to the support member of the base structure.

11. The stand system of claim 10 wherein the platform support structure includes a suspension assembly comprising at least one suspending member linking the platform member to the platform support slider such that the position of the platform support slider along the support member fixes the pivot extent of the platform member.

12. The stand system of claim 9 wherein the platform support structure includes a platform support slider movable along the support member, the support slider having a slider aperture for aligning with one of the plurality of positioning apertures for selectively fixing the position of the support slider with respect to the support member.

13. The stand system of claim 8 wherein the upper end of the support member has a support aperture therein, and additionally comprising a hook member for mounting on an upstanding member and suspending the base assembly from the upstanding member, the hook member comprising:
a mounting portion for penetrating a surface of the upstanding member, the mounting portion having a diameter tapering to a tip, a portion adjacent to the tip having an exterior surface with threads thereon adapted for penetrating the upstanding member,
a hook portion for engaging the support aperture of the support member.

14. The stand system of claim 8 wherein the base assembly comprises a support member having a plurality of positioning apertures; and
a seat structure mounted to the support member and being positionable along a length of the support member, the seat structure comprising:
a carriage assembly being slidably mounted to the support member and being selectively fixable in a plurality of positions; and
an arm assembly including an arm member pivotally mounted to the carriage assembly, the arm member being selectively positionable at a plurality of pivot positions with respect to the carriage assembly.

15. The stand system of claim 8 wherein the seat assembly includes a seat mounted on the arm member, the seat having a seat post being removably mounted in a seat hole in the arm member adjacent to the free end of the arm member, the seat being pivotally mounted to permit rotational movement of the seat with respect to the arm member.

16. The stand system of claim 8 wherein the platform support structure is slidably mounted to the support member of the base structure.

17. The stand system of claim 8 wherein the platform support structure includes a platform support slider movable along the support member, the support slider having a slider aperture for aligning with one of the plurality of positioning apertures for selectively fixing the position of the support slider with respect to the support member.

18. The stand system of claim 17 wherein the platform support structure includes a suspension assembly comprising at least one suspending member linking the platform member to the platform support slider such that the position of the platform support slider along the support member fixes the pivot extent of the platform member.

* * * * *